A. WEBB, W. A. BELTON AND C. P. B. REINGPACH.
FISH SPLITTING MACHINE.
APPLICATION FILED AUG. 16, 1921.
1,402,982.
Patented Jan. 10, 1922.
2 SHEETS—SHEET 1.
Fig:1.
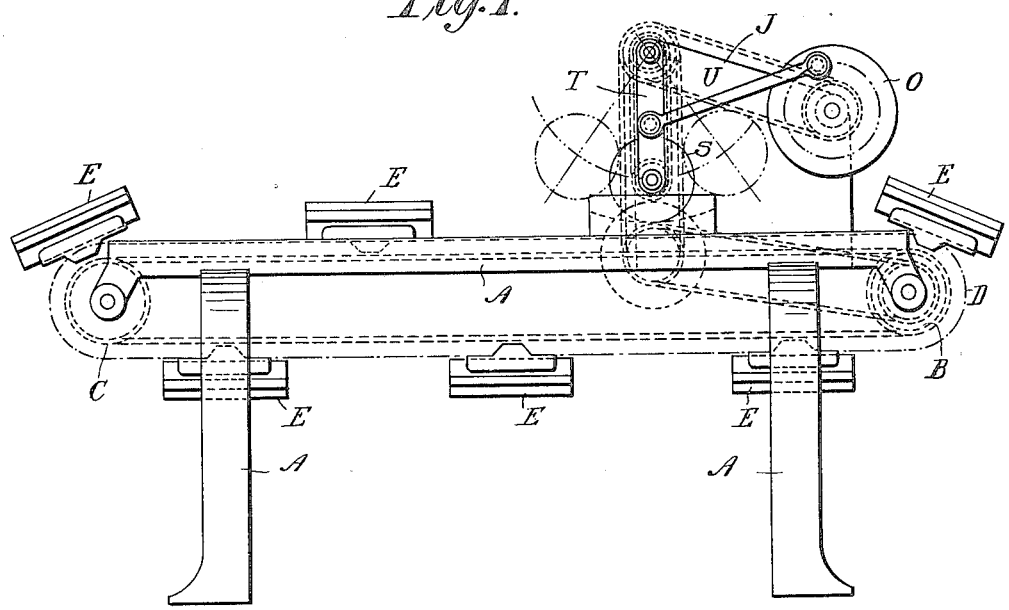
Fig:2.
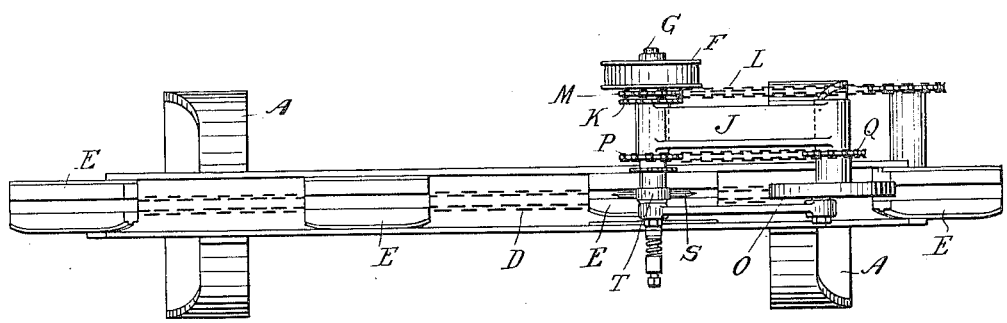
INVENTORS
Arthur Webb, William Ambrose Belton & Charles Paul Bird Reingpach
per Herbert Sefton Jones
Attorney.

A. WEBB, W. A. BELTON AND C. P. B. REINGPACH.
FISH SPLITTING MACHINE.
APPLICATION FILED AUG. 16, 1921.

1,402,982.

Patented Jan. 10, 1922.
2 SHEETS—SHEET 2.

INVENTORS
Arthur Webb, William Ambrose Belton & Carlo Paul Bost Reingpach
per Herbert Sefton Jones
Attorney.

UNITED STATES PATENT OFFICE.

ARTHUR WEBB, OF COLCHESTER, WILLIAM AMBROSE BELTON, OF SOUTH LOWESTOFT, AND CHARLES PAUL BIRD REINGPACH, OF COLCHESTER, ENGLAND.

FISH-SPLITTING MACHINE.

1,402,982.  Specification of Letters Patent.  Patented Jan. 10, 1922.

Application filed August 16, 1921. Serial No. 492,838.

*To all whom it may concern:*

Be it known that we, ARTHUR WEBB, manfacturer, of St. Peter's Engineering Works, Colchester, England, WILLIAM AMBROSE BELTON, manager, of Woodbury, South Lowestoft, England, and CHARLES PAUL BIRD REINGPACH, engineer, of 2 Rawston Road, Colchester, England, all subjects of the King of Great Britain and Ireland, residing at the above addresses, have invented new and useful Improvements in Fish-Splitting Machines, of which the following is a specification.

Our invention relates to a machine for splitting and cutting fish. The first process in the curing of fish consists in dividing the fish longitudinally from head to tail. This operation has hitherto usually been done by hand. The machine which we have devised for effecting the splitting is capable of very rapid action with complete certainty of cut along the middle line of the fish and at such a curve that the cut does not completely divide the lower part of the fish but leaves the two halves adherent to one another.

Our fish splitting machine is illustrated in the accompanying drawing as follows:

Fig. 1 shows a side elevation (partly diagrammatic) of the complete machine.

Fig. 2 shows the plan view of Fig. 1.

Throughout these drawings, A indicates the machine frame, B a positively driven drum or roller for the conveyor bands or chains D, and C the corresponding free drum or roller at the other end of the frame.

The fish holders E are pivotally secured to the conveyor chains at intervals corresponding to about their own length, the speed of the cutter being also proportioned to these dimensions, so that the cutter makes a complete cutting stroke whilst a holder is passing under it, and a complete return stroke in the interval before the arrival of the next holder.

The entire machine is driven from the sheave F (or equivalent transmission) on the shaft G. This shaft has also keyed on it the sprocket wheel which transmits by means of the chain I motion to the driven roller B. In place of the chain a train of spur wheels may be employed.

Vertically above the shaft G there is attached to the main frame A a second frame J supporting the mechanism which operates the cutter.

The rocking lever T is also pivoted on the frame J and supports the cutter mechanism, driven by a second sprocket K on the shaft G and chain wheel L transmitting motion to the sprocket wheel M, which rotates the sleeve N and thus transmits rotary motion to the wheel O pivoted on the sleeve N. The sprocket P also fixed on N drives the sprocket Q on the shaft R. This shaft R is fixed at the lower end of the rocking lever T and there rotates on it the cutter S.

The rocking lever T is connected by means of the tie-rod U with the wheel O. (See Fig. 1).

The rotation of the wheel O will consequently cause the shaft of the cutter S to swing in a curve, the extent of which will be equivalent to twice the distance between the center of the wheel O and the center of the pivot on O of the tie-rod U.

The cutter S is a circular steel blade and is driven continuously in one direction under the impulse of its mechanism, whilst it swings to-and-fro in unison with the motion of the tie-rod U.

The fish holders E attached to the conveyor chains travel as already explained continuously above and below the bed of the frame A, which bed is provided with rims C to act as guides for the holders.

Figure 4:
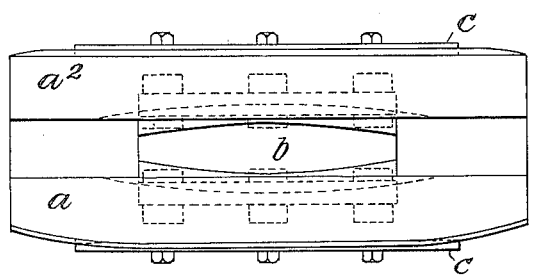
Fig. 4 shows the fish-holding device in plan view.
Figure 5:
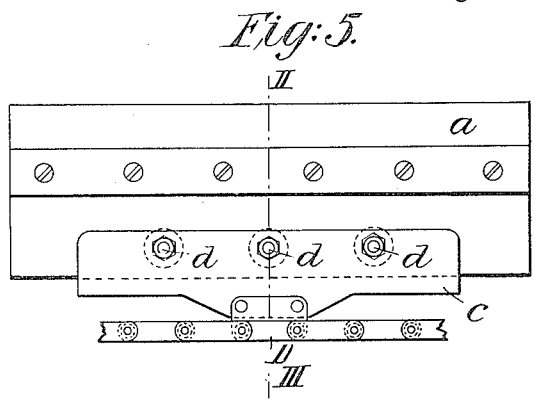
Fig. 5 shows a corresponding side elevation.
Figure 6:
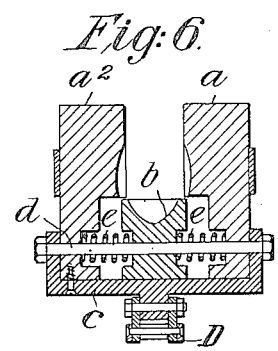
Fig. 6 shows a section of Fig. 5 on the line II—III.

The construction of these holders is shown in detail in Figs. 4, 5 and 6 of the drawings. Each holder is made in three pieces, namely a pair of cheeks or clamps $a$, $a^2$ and a base block $b$, all hollowed out to accommodate a fish, as shown more particularly in Fig. 6. The recessing of these parts enables the apparatus itself to correct any misplacement of the fish whether backward or forward, and compels the fish to assume the proper position for the stroke of the cutter. The clamp $a$ and the base block $b$ are moveable, whilst the clamp $a^2$ is a fixture within the metal rim $c$; both the parts $a$ and $b$ slide on the screwbolts $d$, on the shafts of which are placed spiral springs $e$ which normally push the clamp $a$ and the base-block $b$ somewhat apart from the fixed clamp $a^2$ and thus facilitate the easy insertion of the fish. As the position of the fixed clamp is invariable with regard to the cutter, the mobility of $a$ and $b$ enables fish of differing size within normal limits to be accurately split without special adjustment.

Figure 3:
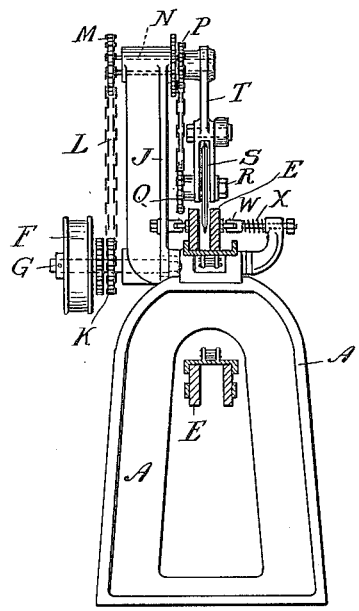
Fig. 3 shows an end view of the machine with the conveyor chains and their supporting rollers omitted to enable the splitting mechanism to be more clearly displayed.

Springs X (Fig. 3) press the moveable clamp $a$ inwards and cause it to grip the fish securely during the cutting.

The clamps or blocks of the holders are made of hard wood, or equivalent material.

The machine operates as follows:

As the fish holder travels towards the cutter, the attendant places a fish, head foremost, within the open jaws, which gradually close on it under the influence of the rollers W as the holder arrives under the cutter. Owing to the position of the fixed block the cutter does not strike the fish exactly in the middle, but a little to one side, and thus avoids cutting through the backbone. The rapidly rotating blade encounters the fish, and splits it from head to tail, the cutting stroke being so adjusted that the cutter does not entirely separate the two halves, but leaves them slightly joined together. The clamps being separate from the base-block on which the fish rests, their inwards motion has no tendency to nip the fish from below and squeeze it upwards, whilst the rollers W prevent the clamps from assuming a position widening from front to rear and thus enabling the fish to slip back from the cutter.

After the holder has passed the cutter and is no longer pressed by the rollers, it opens out, and the split fish falls into the receptacle provided for it.

By means of this machine a very large number of fish can be split with a minimum expenditure of time and labour.

It is obvious that a machine of this construction might be provided with a non-rotating knife adapted to swing or turn in the required curve; also that the operative parts might be duplicated or multiplied in a single frame; but such modifications of detail would not exceed the scope of our invention.

What we claim is:—

1. Improved machine for splitting fish, comprising in combination a conveyer, moveable holders on said conveyor, clamps in said holders adapted to retain in position a fish, and an oscillatable cutter adapted to encounter and divide longitudinally the fish held in position by the said clamps.

2. Improved machine for splitting fish, comprising in combination an endless conveyor capable of rectilinear motion, a plurality of moveable holders arranged at equal intervals on said conveyor, three-part spring clamps in said holders and a rotatable cutter oscillatable in a predetermined curve and adapted to divide longitudinally the fish consecutively presented by the holders.

3. Improved machine for splitting fish, comprising in combination an endless horizontal conveyor, a plurality of holders on said conveyor, a fixed and a moveable clamp in each holder, a recessed and spring-controlled base-block in each holder, said fixed clamp adjusted in each holder to determine the position of the fish backbone with regard to the stroke of the cutter and means for oscillating and rotating the cutter.

4. In a fish splitting machine, the means for receiving, holding in place and presenting to the splitting cutter fish of different sizes, and retaining such in place against the thrust of the cutter, and so that the cut takes place alongside the backbone of the fish, comprising a series of travelling holders having each a pair of recessed shaped clamps, one fixed in the holder, the other moveable under spring pressure, and a spring-controlled moveable recessed base-block, the three parts so co-operating as to grip the fish securely until it has passed the cutter, and then to move apart and enable the split fish to fall out of the holder when the same commences its return journey on the conveyor.

5. In a fish splitting machine, a cutter in combination with means for gripping and presenting the fish to the cutter, mechanism for swinging and positively rotating said cutter in an arc of a circle adjustable to split the fish longitudinally alongside the backbone, without entirely severing it at the under part.

In testimony whereof we have signed our names to this specification.

ARTHUR WEBB.
WILLIAM AMBROSE BELTON.
CHARLES PAUL BIRD REINGPACH.